April 1, 1958  H. R. LORCH ET AL  2,829,357
COMPRESSION JOINT FOR ELECTRIC CONDUCTORS
Filed May 17, 1955  2 Sheets-Sheet 2
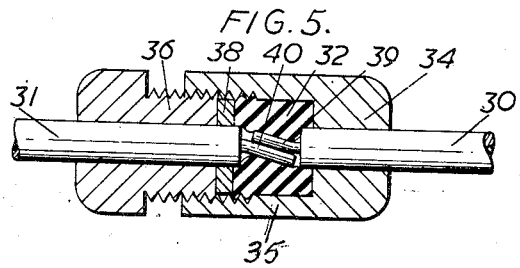
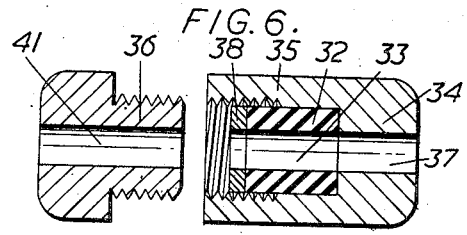
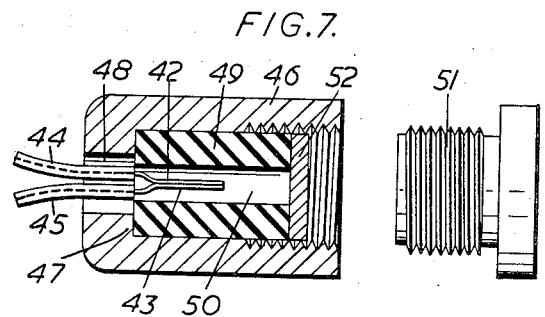
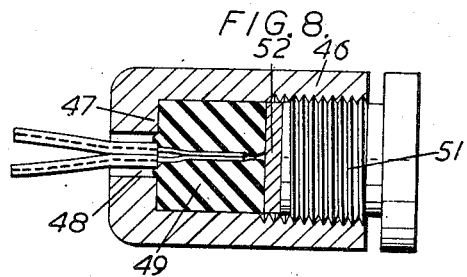
Inventors
Hermann Richard Lorch
James Alexander McCleery
By
Attorneys United States Patent Office 2,829,357
Patented Apr. 1, 1958

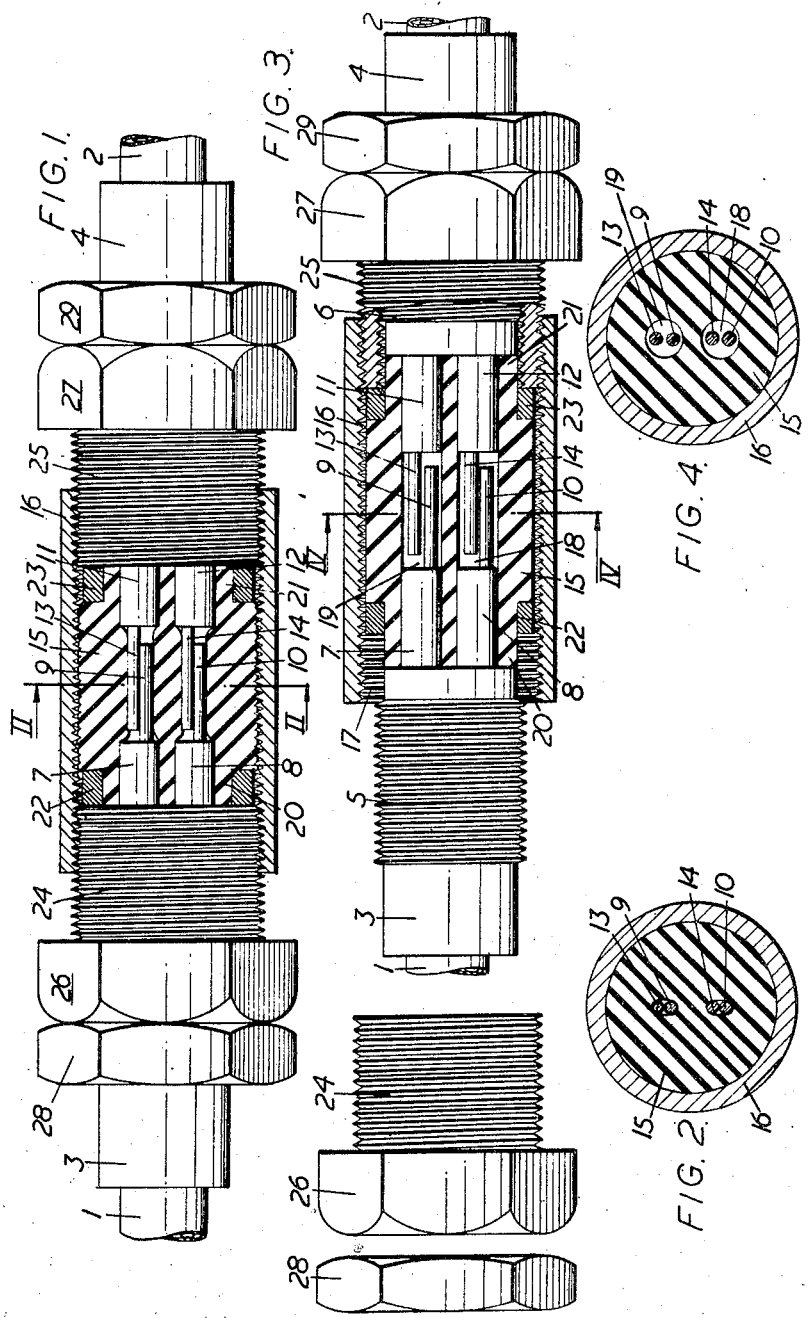

2,829,357

COMPRESSION JOINT FOR ELECTRIC CONDUCTORS

Hermann Richard Lorch, Southport, and James Alexander McCleery, Sale, England, assignors to British Insulated Callender's Cables Limited, London, England, a British company Application May 17, 1955, Serial No. 509,059

Claims priority, application Great Britain May 20, 1954

9 Claims. (Cl. 339—61)

This invention relates to a jointing device for coupling electric wires by the method of placing the wires side by side (with or without twisting them together) and forcing them into contact by side pressure.

In accordance with the invention the ends of the wires to be coupled are inserted in a hole in a block of rubber, or other rubber-like elastic material, and the block is enclosed and subjected to compression whereby the side surfaces of the hole are caused to move inwards and press the wires together. It will be understood that the hole initially is not much greater than is necessary to permit the easy insertion of the lengths of wire side by side. There is, however, no need for a close fit at the initial stage. This is brought about by the compression of the block. In most instances it is only required to couple two wires together but the invention is applicable for coupling groups of three or more wires.

A single block may have more than one hole to accommodate more than one coupling and among its advantages is that it provides for the coupling at one operation of a number of groups of wires, for instance a number of pairs of wires in the jointing of two multi-core cables, in a much more restricted space than is practicable with the majority of known methods. The ends of the wires to be coupled may be inserted into a hole in the block from the same end or from opposite ends.

The compression of the block is conveniently effected by enclosing it in a case which it fits and forcibly moving a pressure plate of rigid material in the case into pressing engagement with the block. In the preferred arrangement the case is a tube open at one or both ends, the pressure plate, or each plate, being perforated with a hole to register with the hole, or each hole, in the block and being forced into the open end of the case, for instance, by a screwed sleeve or nipple screwed into or on to the case and pressing on the outer edge part of the plate. The screwed sleeve may also connect the case to the enclosing member of the insulated wires which are being jointed, for instance to a conduit or to a cable sheath. Most conveniently the tubular case is cylindrical with the pressure plate in the form of a disc. Where the block is provided with several holes, the pressure plate may be pierced with a single aperture large enough to give access to all the holes in the block.

The invention will be further indicated by the following descriptions of examples which are represented diagrammatically in the accompanying drawings, wherein:

Figure 1 is a sectional view of a joint between two metal-sheathed cables;

Figure 2 is a sectional view of the joint on the line II—II in Figure 1;

Figure 3 is a sectional view of the same joint partly assembled;

Figure 4 is a sectional view of the arrangement shown in Figure 3, taken on the line IV—IV;

Figure 5 is a sectional view of a joint between two single insulated wires;

Figure 6 is a similar sectional view of the partly assembled components of the joint shown in Figure 5;

Figure 7 is a sectional view of another form of joint partly assembled; and

Figure 8 is a sectional view of the arrangement shown in Figure 7, but after being completely assembled.

In the first example illustrated in Figures 1 to 4 the improved coupling device is used to connect together two metal-sheathed electric cables 1, 2. Before being connected together the cables are provided with terminal fittings 3, 4 having externally screw threaded end portions 5, 6 (see Figure 3), the internal construction of these fittings forming no part of this invention. From the end faces of the fittings 3, 4 extend short lengths of insulating sleeving and beyond the ends of the sleeving the bared ends of the cable conductors. At the end of one cable 1 there extend the sleeves 7 and 8 surrounding the conductor ends 9 and 10 respectively and similarly from the other cable 2 the sleeves 11 and 12 surrounding the conductors 13 and 14. The object of the device is to make conductive connection between the pair of conductors 9 and 13 and between the pair 10 and 14. The coupling block 15 of vulcanised polychloroprene, a rubber-like elastic material is enclosed in a short cylindrical metal case 16 provided throughout its length on its inner surface with a screw-thread 17, see Figure 3. The coupling block 15 is a cylindrical block which is a sliding fit within the tubular case 16 and is provided with two circular section parallel passages 18, 19. At the ends 20, 21 the diameter of the block 15 is reduced to form stepped seatings for rectangular section metal rings 22, 23 respectively, each of diameter slightly less than the internal diameter of the case 16. The ends 20, 21 of the block are reduced to a diameter slightly less than the maximum diameter over the screw threaded portions 5, 6 of the cable terminal fittings 3, 4. Internally and externally screw-threaded sleeves 24, 25 are provided to screw one into each end of the case 16, the external threads engaging the internal threads of the case and the internal threads engaging the external threads on the portions 5, 6 of the terminal fittings 3, 4. At their outer ends the sleeves 24, 25 are formed with short hexagonal enlargements 26, 27 for engagement by a spanner, and locking nuts 28, 29 are also provided for locking the engagement between the sleeves 24, 25 and threaded portions 5, 6 of the fittings 3, 4.

In making the connection between the two cables with this device, the rubber-like block 15 is inserted centrally within the case 16, as shown in Figure 3, with the rings 22, 23 in position on the reduced end portions 20, 21. The fittings 3, 4 have already been applied to the cables with the conductors appropriately exposed at their ends. The locking nuts 27, 28 and sleeves 24, 25 are slipped over the ends of the cables. The fittings 3, 4 are then introduced one at each end into the case 16 so that in the region of the block 15 the ends of the cable conductors are in overlapping arrangement. In one passage 19 the conductor end 9 of cable 1 overlaps the conductor end 13 of cable 2, and similarly in the other passage 18 the conductor end 10 of cable 1 overlaps the conductor 14 of cable 2. This arrangement of the conductor ends is shown in section in Figure 4. It will be seen from the drawings that the ends of the insulating sleeves, 7, 8, 11 and 12, are also positioned in the ends of the passages 18 and 19, but in an alternative arrangement the conductor ends alone may be disposed within these passages, the length of each bared conductor being equal to or somewhat less than the length of the passages. The two sleeves 24, 25 are now screwed into the case until their ends engage the rings 22, 23. Both sleeves 24, 25 are screwed forcibly into the case against the rings 22, 23 so that the central portion of the block 15 is subject to endwise compression. This causes lateral expansion of the central part of the block 15, tending to close the passages 18, 19 and to expand outwards into tight engagement with the screw thread on the inside of the case. The closing of the passages 18, 19 forces their walls into pressing engagement with the conductor ends disposed in overlapping arrangement within them, as illustrated in Figures 1 and 2, so that there is obtained a good conductive engagement between the conductors 9 and 13 in passage 19 and between the conductors 10 and 14 in the other passage 18.

In an actual construction in accordance with the invention, the case 16 was a cylinder of length equal to about twice its diameter, the portion of the block 15 extending between the rings 22, 23 was about equal in length to its diameter, the passages 18, 19 were each 0.160 inch diameter and the cable conductors were single round copper wires of 0.002 square inch section. The presence of the joint, or of two joints in series, in a cable length did not increase the conductor resistance measured between the cable ends as compared with a length of cable having no joints. Furthermore on prolonged current overload the temperature of the joint remained substantially below that of the cable, due to the greater surface area at the joint for heat dissipation, and the joint did not appear to be damaged.

In Figure 5 two single conductor cables 30, 31 are shown connected together by an arrangement in which the compressible block 32, pierced by a single central passage 33, is compressed between an end wall 34 of an insulating casing 35 and an insulating sleeve 36 screwed into the other end of the casing. The casing 35 is provided with a longitudinal bore 37 for the insertion of the end of one cable 30. This bore 37 is enlarged a short distance from the point of entry of the cable to receive the tubular block 32 which does not extend completely between the transverse inner face of the end wall 34 and the other end of the casing. From a point less than the length of the block 32 from the end wall 34, to the other end, the internal surface of the casing 35 is screw threaded to receive the screw threaded sleeve 36. In the illustration, this screw threaded portion of the casing 35 is of the same internal diameter as the part accommodating the block 32, but in an alternative arrangement the diameter may be increased over the screw threaded part. The sleeve 36 is also provided with a central bore 41 to receive the end of the other cable 31. Between the sleeve 36 and the block 32 there is arranged a washer 38, which may be dispensed with, to transmit pressure from the sleeve to the block. In use, the conductors 39, 40 are exposed at the cable ends. The end of one cable 30 is inserted through the bore 37 of the end wall 34 until the conductor end 39 is located centrally within the passage 33 in the block 32. Over the end of the other cable 31 there is now threaded the sleeve 36 and washer 38 and the bared conductor 40 at the end of this cable is inserted into the passage 33 in the block 32 so that it overlaps the other conductor end 39. The sleeve 36 is now screwed into the casing 35 to compress the block 32 between the washer 38 and the end wall 34. Expansion of the block 32 laterally tends to close the passage 33 so that the conductors 39, 40 are squeezed by the passage walls into tight conductive engagement with one another as shown in Figure 5.

In Figures 7 and 8 is shown an arrangement for joining the ends of two conductors 42, 43 of two single core cables 44, 45 which enter at the same end of the fitting. In this construction the casing 46 is similar to that shown in Figures 5 and 6, in that it is closed at one end by an end wall 47, having a central bore 48, is screw threaded internally at the other end and accommodates a tubular rubber block 49. In this case the ends of both cables 44, 45 are inserted through the bore 48 in the end wall 47 so that the bared conductor ends lie side-by-side in the central passage 50 in the block 49. The block 49 is now compressed by screwing a bush 51 into the internally threaded end of the casing 46, with or without the provision of a disc 52 between the block 49 and bush 51. As in the previously described arrangements the conductor ends 42, 43 are forced into conductive engagement by the inward movement of the wall of the passage 50.

A number of cables can be united in groups by a modification of the arrangement shown in Figures 7 and 8. In this modification the block 49 will have a passage, such as the passage 50, for each group to be joined, the end wall 47 being appropriately bored to give access to the passages. In Figures 7 and 8, the bush 51 and disc 52 are shown as solid members, but it will be seen that either of them may be centrally bored. Furthermore, by making the bush 51 in the form of a sleeve and replacing the disc 52 by a washer, the device can be used in the same manner as that shown in Figures 5 and 6. It will be seen also that by replacing the washer 38, in Figures 5 and 6, by a disc, the device is applicable in the same manner as that shown in Figures 7 and 8. The bush 51 in Figures 7 and 8 may be in the form of an externally screw-threaded cap adapted to engage an external thread on the casing 46 and adapted to compress the block by means of an integral axial projection entering the end of the casing 46 or by pressure of the cap against an extension from the disc 52.

Although the invention has been described in connection with the coupling of single wires, it is equally applicable to the coupling of stranded conductors. Furthermore, where the two conductors to be joined enter the compressible block from one end, they may first be twisted together. Also, although the couplings illustrated are between pairs of wires, the invention is similarly applicable to coupling a group of three or more wires, in which case the apertures giving access to the hole or holes in the block will be of a size appropriate to receive the large number of conductors.

What we claim as our invention is:

1. A jointing device for coupling together at least one group of electric wires, comprising a block of rubber or rubber-like elastic material with at least one aperture therein to receive freely in side-by-side arrangement the ends of the wires of a group, a casing enclosing and fitting substantially closely about said block and a plate of rigid material forcibly movable in said casing to compress said block cause the walls of said aperture to move inwards to press together the wires therein under direct contact between the material and the wires.

2. A jointing device for coupling together at least one group of electric wires, comprising a block of rubber or rubber-like elastic material with at least one aperture therein to receive freely in side-by-side arrangement the ends of the wires of a group, a tubular casing open at one end and fitting substantially closely about said block, a rigid pressure plate movable in said open end and means in screw-threaded engagement with the casing to forcibly move said plate into engagement with said block whereby the block is compressible to cause the walls of said aperture to move inwards to press together the wires therein under direct contact between the material and the wires.

3. A jointing device for coupling together at least one group of electric wires, comprising a block of rubber or rubber-like elastic material with at least one aperture therein to receive freely in side-by-side arrangement the ends of the wires of a group, a tubular casing open at both ends and fitting substantially closely about said block, two rigid pressure plates movable one in each open end of the casing and means in screw-threaded engagement with each end of the casing to forcibly move the said plates to compress the block between them cause the walls of said aperture to move inwards to press together the wires therein under direct contact between the material and the wires.

4. A jointing device for coupling together at least one group of electric wires, comprising a block of rubber or rubber-like elastic material with at least one aperture therein to receive freely in side-by-side arrangement the ends of the wires of a group, a tubular casing open at one end and fitting closely about said block, a rigid plate movable in said casing, a pressure member in screw-threaded engagement with the casing to forcibly move said plate into engagement with the block whereby the block is compressible to cause the walls of said aperture to move inwards to press together the wires therein under direct contact between the material and the wires, and said plate and pressure member being provided with apertures for the insertion of the wires into said aperture.

5. A jointing device for coupling together at least one group of electric wires, comprising a block of rubber or rubber-like elastic material with at least one aperture therein to receive freely in side-by-side arrangement the ends of the wires of a group, a tubular casing open at both ends and fitting closely about said block, two rigid plates movable one in each end of the casing, two pressure members in screw-threaded engagement with, and one at each end of, the casing to forcibly move said plates to compress the block between them, the said plates and pressure members being provided with apertures for the insertion of the wires into said aperture where the ends of the wires are pressed together by the inward movement of the aperture walls to bring the material into direct contact with the wires when the block is compressed.

6. A jointing device for coupling together at least one group of electric wires comprising a compressible block with an aperture therein for freely receiving the ends of each group of wires in side-by-side arrangement and wherein the wires will be pressed together by the walls of the aperture moving inwards to bring the material into direct contact with the wire when the block is compressed, a tubular casing open at one end and fitting closely about the block, an aperture in the closed end of the casing for the passage of the wires into said aperture, a pressure member in screw-threaded engagement with the casing and a rigid plate movable in the casing by the pressure member to compress the block between said plate and said closed end.

7. A jointing device for coupling together at least one pair of electric wires, comprising a cylindrical casing open at each end and, closely fitting therein, a compressible block apertured to provide a separate hole parallel with the axis of the casing for freely receiving each pair of wires in side-by-side arrangement, at each end of the casing a rigid disc movable therein and a sleeve in screw-threaded engagement with the casing, an entry in each disc for the insertion of each of a pair of wires one at each end through the sleeve and disc into said block, the sleeves being adapted to move the discs to compress the block between them in order to cause the sides of the hole to move inwards to press together the pair of wires therein under direct contact between the material and the wires.

8. A jointing device for coupling together a pair of wires, comprising a compressible block of rubber or rubbber-like elastic material apertured to receive freely the wires in side-by-side arrangement, and a cylindrical casing fitting closely about said block, screw-threads on the cylindrical internal surface of said casing and means engageable with said screw threads to move into said casing to compress said block, said block under compression being expandable into engagement with said screw threads and into direct contact with the wires to press together said wires arranged within the block.

9. A jointing device as claimed in claim 8, in which the casing and means in screw-threaded engagement therewith are formed of insulating material.

References Cited in the file of this patent

UNITED STATES PATENTS

| | | |
|---|---|---|
| 2,379,942 | Webber | July 10, 1945 |
| 2,636,068 | Perkins | Apr. 21, 1953 |
| 2,688,735 | Hubbell | Sept. 7, 1954 |
| 2,788,384 | Gay | Apr. 9, 1957 |